June 16, 1925.

J. B. HOOD 1,542,247

LOCKING DEVICE FOR BOLT NUTS AND THE LIKE

Filed Aug. 18, 1924

Inventor
James Bruce Hood
By his Attorney
Richard N. Hoffmann

Patented June 16, 1925.

1,542,247

UNITED STATES PATENT OFFICE.

JAMES BRUCE HOOD, OF NEWARK, NEW JERSEY.

LOCKING DEVICE FOR BOLT NUTS AND THE LIKE.

Application filed August 18, 1924. Serial No. 732,634.

*To all whom it may concern:*

Be it known that I, JAMES BRUCE HOOD, a subject of the King of Great Britain and Ireland, residing at No. 10 Second Avenue, Newark, in the county of Essex and State of New Jersey, have invented certain new and useful Improvements in Locking Devices for Bolt Nuts and the like, of which the following is a specification.

This invention relates to improvements in nut locking devices for use in connection with bolts, studs, screwed spindles, adjusting screws and similar machine elements, and has for its principal object the production of an improved locking nut, which when put into its proper place on the screwed rod, can easily and securely be locked against any displacement in a downward or upward direction.

Another object is to afford facilities for effecting the locking as well as the unlocking of this device in an easy and instantaneous manner without the help of any special or elaborate tools.

A third object is to furnish an improved locking device which is reduced to a minimum of material and cost of production, retaining a maximum of reliable efficiency, inherent in similar former devices, based on the same or similar principles.

A fourth object is to make this device applicable to any standard bolt or screw connection of whatever size without essential alterations in said machine elements.

These objects are attained by the device described hereafter and illustrated in the accompanying drawing, in which—

Similar numerals refer to similar parts throughout the several views.

The invention proper is an improvement, development and simplification of two former devices of the applicant, covered and described by U. S. Patent 1,324,822 of Dec. 7, 1917, and British Patent 153,819 of Nov. 18, 1920.

These prior devices, although based upon a similar principle as the present invention, lack several novel and important features of the new locking device, which are in compass with the objects stated above.

The active element of these locking devices, as formerly described, was a coil of metal or spiral spring, adapted to engage by friction with the screw thread of the bolt on one end and fastened or held in a recess of the nut on the other end. As the pitch of this spring differed by a small fraction from the pitch of the bolt thread, the coil being otherwise arranged so as to form a continuation of the last thread in the nut, any backward or unlocking movement of the latter would tend to tighten the grip of the spring upon the thread, not only along the periphery, but also in an axial direction, thereby effectively counteracting the disengaging movement.

This active principle is retained in the new device, but has been modified in the manner presently described.

Figure 1:
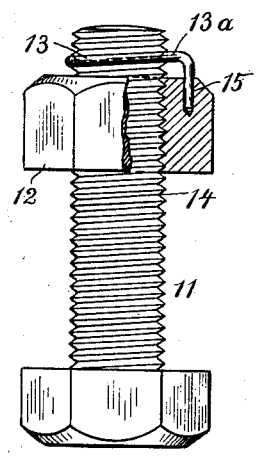
Figure 1 is the elevation of a bolt, provided with the improved nut locking device.

In Figure 1 the numeral 11 designates the bolt upon which the nut 12 is threaded. The locking spring which formerly consisted of one or more complete coils of wire wound around and approximately fitting into the grooves 14 of the bolt thread, has presently been reduced to approximately a semi-circle of resilient wire 13, with a straight short end 13ª, bent at a right angle to the plane of the convolution.

Figure 5:
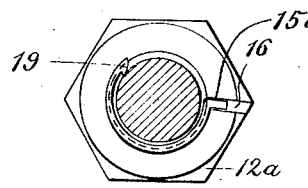
Figure 5 illustrates another modification of the device.

This straight and downwardly bent end, similar in shape to the corresponding coil end, shown in the British patent of record, is likewise recessed in a hole 15, drilled in the nut 12, or, as 15ª in Figure 5 shows, may be on a horizontal plane and inserted in an open slot 16, sunk for a suitable depth and length into the side of the nut 12ª.

Figure 2:
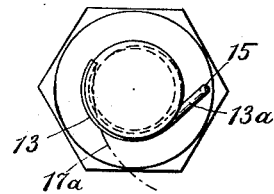
Figure 2 is a plan view of a nut, showing the arrangement of the device, when locked.
Figure 3:
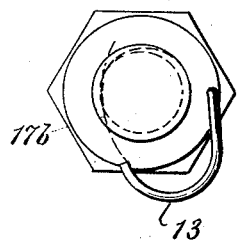
Figure 3 is a plan view of the same nut, showing the device before locking.

The real circumferential length of the locking spring 13 is determined and limited by two conditions. It must be long enough to form a strong snap or catch on the bolt, if one tries to swing the spring around its fulcrumed end, either in the act of locking or of unlocking the device, and would therefore undercut the threaded periphery, if the spring had no resiliency or the bolt surface no resistance, as the dotted lines 17ª and 17ᵇ in the Figures 2 and 3, respectively, indicate.

On the other hand it must not be longer than would be practically consistent with a not too forceful or difficult manipulation in closing or unlocking the device.

The forcing of the catch into place could for instance be effected by wedging the spring into the thread groove over the top surface of the nut by a wooden stick, and the unlocking could be accomplished by prying the curved end of the spring back over the engaging thread with the same emergency tool or with the bit of a screw driver or any other suitable and handy instrument.

With the fulcrum end 13ª and the hole 15 arranged in the position shown, just one semi-circular turn of the coil would be sufficient; in other cases, with the recessed end placed slightly different, a trifle more than a semi-circle may be necessary.

It is apparent that, as before, a slight turning down and tightening of the nut would still be possible, as such movement tends to open the coil segment and lessens its friction in the groove of the thread, whereas when the nut begins to turn in an upward direction, the coil segment is immediately strained and forced closer into the groove, increasing the friction correspondingly and with ever growing pressure. A secure locking of the nut is thereby effected.

Figure 4:
Figure 4 is a perspective view of a modified locking spring.

The forceful pressure exerted by the complete turns of the spring in the formerly patented devices, recorded above, is of course reduced to some extent in the newly described improved form which has the advantage of easier means for adjusting the nut and applying and locking the spring, though the pressure can still be kept within sufficient range of efficiency, but this sacrifice of force can be compensated either by choosing a heavier wire, thus increasing the grip, or by forming the friction or contact surface of the spring with additional gripping means, be this a serrated inner surface 18, as shown in Figure 4, or a single dent or barb 19, as Figure 5 indicates.

Figure 6:
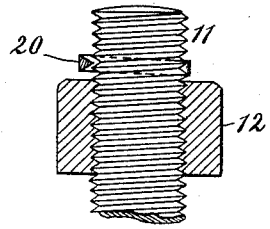
Figure 6 shows a locking spring of special cross section, the pertaining parts of the bolt and nut partially indicated in section.

Or the wire itself may be made of special section, fitting closely into the groove of the screw thread. Figure 6 for instance shows a wire of triangular cross section 20ª. This latter form or a similar modification would be especially adapted to threads of a finer pitch.

Figure 7:
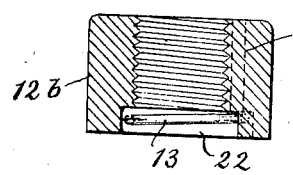
Figure 7 shows the device, located in the recess of a nut.
Figure 8:
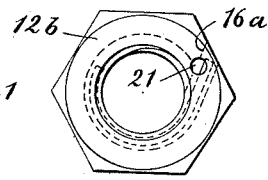
Figure 8 is a top view of this nut.

Figure 7 shows how the application of the locking spring may be attained in the recess 22 of a nut 12ᵇ, so as to hide it from view, as sometimes is required, or prevent its interference with other parts being in immediate proximity of the nut.

The straight end of the spring rests in a groove or slot 16ª, and for the easy unlocking of the device a small vertical hole 21 may be provided, so positioned that, when a pin is passed therethrough, the latter will be forced between a portion of the coil spring and the nut, and the tension of the spring be taken off the threads of the bolt, so that the nut may be easily unscrewed.

What I claim as my invention and desire to protect by Letters Patent is:—

1. A nut locking device, comprising a resilient element, fulcrumed on and supported by the nut to be locked and forming a semicircular continuous contact with the thread of the bolt, said resilient element adapted to be swung free of the bolt for the purpose of either tightening or unlocking the nut, or to frictionally engage the bolt along said semicircular contact for the purpose of locking said nut against an unscrewing movement.

2. The combination with a threaded nut, provided with a recess on its top surface, and engaging with a bolt; of an approximately semi-circular locking spring concentric with the axis of the bolt and having an outwardly turned outer end, fulcrumed in said recess, said spring being adapted to exert a braking effect upon the bolt when the latter is turned in the direction of said spring.

3. A nut locking device, comprising a nut and a resilient coil segment, concentric with and frictionally engaging the helix of the bolt to which the nut may be applied, one end of said segment to be movably hinged to the top surface of the nut and the other end wound in a direction corresponding to the unscrewing direction of the helix.

4. In a nut locking device a semi-circular spring, formed at one end with means to pivotally fasten said spring to the top of a nut, and adapted to engage the thread of the bolt to which the nut is applied and to restrain its disengaging movement by frictional continuous contact in proportion to the tension, to which said spring is subjected thereby.

5. A nut locking device, comprising a nut, having on its top surface a recess in proximity, but not in contact with the bolt to which the nut may be applied, a segmental spring coil wound to fit into the thread of said bolt in a retrogressive direction, fulcrumed at one end in said recess and of such length, that the other end can describe a circle whose radius is slightly smaller than the sum of the nut thread diameter plus the distance of the fulcrum from the thread, so that the segmental spring coil when sprung over the outer periphery of the bolt thread exerts a continuous gripping and locking pressure on said bolt.

6. A nut and bolt lock comprising a nut having a drilled hole in its top, spaced parallel with its axis, a spring wire pivotally engaged in the hole, said wire being bent at a right angle thereabove to extend at a tangent to the bolt, following the thread in a direction leading towards the bolt head, said wire being bent thereafter to a radius equal to that of the root of the thread on said bolt and terminating at a point directly opposite the point of contact between the tangential portion of the wire and said bolt, the diameter of said wire not exceeding the distance between adjacent convolutions of the threads of said bolt.

7. A nut and bolt lock comprising a nut having a drilled hole in its top, spaced parallel with its axis, a spring wire having one end entrable in the mentioned hole, the extending portion being bent at a right angle to extend tangentially into contact with the threads of said bolt and thereafter curved in conformity with the thread to a point opposite the point of tangent contact, following said thread in a direction leading towards the bolt head, and a barb extending radially inward from the extremity of the curved portion of said wire, said wire being substantially equal in diameter to the screw pitch of said bolt.

In testimony whereof, I have signed my name to this specification in the presence of two subscribing witnesses, this day of August 5th 1924.

JAMES BRUCE HOOD.

Witnesses:
 MAX CURT FRAUDE,
 PIERRE L. GODOL.